(12) United States Patent
Young (10) Patent No.: US 9,374,754 B2
(45) Date of Patent: Jun. 21, 2016

(54) SYNCHRONIZATION MECHANISM (75) Inventor: Robert Young, Cambridge (GB)

(73) Assignee: Neul Ltd., Cambridge (GB)

( * ) Notice: Subject to any disclaimer, the term of this patent is extended or adjusted under 35 U.S.C. 154(b) by 423 days.

(21) Appl. No.: 14/126,074

(22) PCT Filed: Jun. 12, 2012

(86) PCT No.: PCT/EP2012/061104
§ 371 (c)(1),
(2), (4) Date: Apr. 4, 2014

(87) PCT Pub. No.: WO2012/171909
PCT Pub. Date: Dec. 20, 2012

(65) Prior Publication Data
US 2014/0219268 A1    Aug. 7, 2014

(30) Foreign Application Priority Data

| | | |
|---|---|---|
| Jun. 13, 2011 | (GB) | 1109829.0 |
| Jun. 13, 2011 | (GB) | 1109830.8 |
| Jun. 13, 2011 | (GB) | 1109836.5 |
| Jun. 13, 2011 | (GB) | 1109837.3 |
| Jun. 13, 2011 | (GB) | 1109840.7 |
| Jun. 13, 2011 | (GB) | 1109844.9 |
| Jun. 13, 2011 | (GB) | 1109848.0 |
| Jun. 13, 2011 | (GB) | 1109850.6 |
| Jun. 13, 2011 | (GB) | 1109853.0 |
| Jun. 13, 2011 | (GB) | 1109854.8 |
| Jun. 13, 2011 | (GB) | 1109863.9 |
| Jun. 13, 2011 | (GB) | 1109867.0 |
| Jun. 13, 2011 | (GB) | 1109874.6 |
| Sep. 30, 2011 | (GB) | 1116910.9 |
| Feb. 24, 2012 | (GB) | 1203258.7 |

(51) Int. Cl.
*H04W 56/00*    (2009.01)
*H04W 36/22*    (2009.01)
(Continued)

(52) U.S. Cl.
CPC ............... *H04W 36/22* (2013.01); *H04B 1/713* (2013.01); *H04L 5/0032* (2013.01); *H04L 7/041* (2013.01);
(Continued)

(58) Field of Classification Search
CPC . H04W 36/22; H04W 72/048; H04W 28/065; H04W 56/001; H04W 24/02; H04W 72/1242; H04W 36/0066; H04W 56/0015; H04W 8/18; H04W 4/005; H04L 47/10; H04L 69/18; H04L 67/28; H04L 5/0032; H04B 1/713
USPC .......................................... 370/350; 375/362
See application file for complete search history.

(56) References Cited

U.S. PATENT DOCUMENTS 5,748,676 A    5/1998   Mahany
5,818,872 A    10/1998  Gupta
(Continued)

FOREIGN PATENT DOCUMENTS

EP    1611706        10/2004
GB    2320868 A      7/1998
(Continued)

*Primary Examiner* — Kwang B Yao
*Assistant Examiner* — Syed M Bokhari
(74) *Attorney, Agent, or Firm* — Slater Matsil, LLP (57) ABSTRACT

A method for synchronising a receiving device with a transmitting device in a wireless communication network comprising forming a synchronisation sequence that has a frequency spectrum comprising peaks at multiple discrete fundamental frequencies, a signal power of the synchronisation sequence being concentrated at those frequencies, and transmitting said synchronisation sequence from the transmitting device to the receiving device.

20 Claims, 9 Drawing Sheets

(51) Int. Cl.
| | |
|---|---|
| H04L 12/801 | (2013.01) |
| H04L 7/04 | (2006.01) |
| H04L 25/06 | (2006.01) |
| H04W 4/00 | (2009.01) |
| H04W 64/00 | (2009.01) |
| H04W 72/12 | (2009.01) |
| H04B 1/713 | (2011.01) |
| H04L 5/00 | (2006.01) |
| H04W 8/18 | (2009.01) |
| H04W 36/00 | (2009.01) |
| H04W 72/04 | (2009.01) |
| H04W 28/06 | (2009.01) |
| H04W 24/02 | (2009.01) |
| H04L 29/08 | (2006.01) |
| H04L 29/06 | (2006.01) |
| H04B 7/26 | (2006.01) |
| H04W 16/14 | (2009.01) |
| H04W 88/10 | (2009.01) |
| H04W 12/06 | (2009.01) |

(52) U.S. Cl.
CPC .............. *H04L 25/061* (2013.01); *H04L 47/10* (2013.01); *H04L 67/28* (2013.01); *H04L 69/18* (2013.01); *H04W 4/005* (2013.01); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(56) References Cited

U.S. PATENT DOCUMENTS

2010/0135447 A1* 6/2010 Sapozhnykov ..... H04L 27/2675
375/362
2011/0013708 A1 1/2011 Hedayat et al.

FOREIGN PATENT DOCUMENTS

| WO | 9837674 A1 | 8/1998 |
| WO | 2006129166 A1 | 12/2006 |

* cited by examiner

SYNCHRONIZATION MECHANISM

The invention relates to methods and apparatus for synchronising one communication device with another communication device. For example, one or more embodiments of the invention may be used to synchronise a terminal operating in a wireless communication network with one or more base stations in the network.

In a wireless communication network, a terminal often has to be able to detect a transmission from a base station. Terminals also often have to obtain an estimate of the frequency error of the base station's transmissions relative to the terminal's internal frequency reference. This process usually has to be completed prior to decoding any real data that the base station might be transmitting. This initial detection and frequency error acquisition process should be robust to a number of signal impairments. For example:

Low signal-to-noise ratio due to large propagation losses;
Large frequency errors due to errors in the frequency reference used by the terminal;
Multipath; and
Interference from other transmitters, either from unrelated communications systems operating in the same frequency channel, or from other base stations belonging to the same communication network.

In wireless communications systems that operate using a repeated "frame" structure it is convenient to insert a "frame synchronisation" signal at the start of each frame that can be used by terminals to detect the signal and to extract an initial frequency error estimate. This initial frequency error estimate is important for decoding the subsequent information in case the size of the frequency error is greater than the maximum frequency error that is allowed by the demodulation process for the subsequent data.

The frame synchronisation sequence preferably supports high "processing gain" reception if the communications system is required to operate with poor signal to noise ratios. The terminal must also be able to detect the signal in difficult multipath channels.

One option would be to transmit a very simple type of signal to allow detection and frequency error estimation like a continuous tone (i.e. a discrete frequency). In this case the terminal would correlate against tones having a range of different frequencies in order to detect the presence of the specific tone from a given base station (which could be done efficiently using a fast Fourier transform, for example). The length of this correlation would determine the amount of processing gain that is achieved to detect the signal in poor SNR, while the offset between the detected frequency and the expected frequency of the tone would provide the frequency error estimate. Different base stations could use different tone frequencies to avoid interference between the base stations, so long as the terminal knows the allowed systematic offsets and there is no ambiguity with the range of possible frequency errors. The problem with this simple approach is that it is not robust to multipath because the tone frequency might coincide with a deep null. Similarly it is not robust to narrowband interference because the interferer frequency might coincide with the tone frequency.

Another option would be to transmit a signal of continuously increasing or decreasing frequency (known as a "chirp") to allow detection and frequency error estimation. Chirps can be made robust to multipath and interference by spanning a relatively wide bandwidth. However, chirps are not as straightforward to detect as a continuous tone, nor do they provide such a clear indication of frequency error.

Therefore, there is a need for a mechanism for assisting wireless terminals to detect signals from a base station.

According to a first embodiment of the invention, there is provided a method for synchronising a receiving device with a transmitting device in a wireless communication network comprising forming a synchronisation sequence that has a frequency spectrum comprising peaks at multiple discrete fundamental frequencies, a signal power of the synchronisation sequence being concentrated at those frequencies, and transmitting said synchronisation sequence from the transmitting device to the receiving device.

The method may comprise forming the synchronisation sequence to have a frequency spectrum in which the peaks are substantially equally spaced.

The method may comprise forming the synchronisation sequence to have a frequency spectrum in which the peak at each of the discrete fundamental frequencies contains substantially the same signal power.

The method may comprise forming the synchronisation sequence to have a frequency spectrum with a comb-like structure.

The method may comprise forming the synchronisation sequence by periodically repeating, in the time domain, a block of N samples.

The method may comprise obtaining said block of N samples at a sample rate Fs, thereby forming a synchronisation sequence in which neighbouring ones of the discrete fundamental frequencies are spaced at Fs/N.

The method may comprise selecting the number of samples N in each repeating block of samples and/or the sampling frequency Fs of those N samples to achieve a desired spacing between neighbouring ones of the discrete fundamental frequencies.

The method may comprise filtering the synchronisation sequence prior to transmission so as to limit the bandwidth of the synchronisation sequence to comprise signal components at the multiple discrete fundamental frequencies but not at harmonics of those frequencies.

The method may comprise applying a frequency offset to the synchronisation sequence prior to transmission.

The method may comprise selecting the frequency offset in dependence on the transmitting device that will transmit the synchronisation sequence.

The method may comprise selecting the frequency offset to be different from a frequency offset being applied by other transmitting devices.

The method may comprise selecting the frequency offset to be smaller than the spacing between neighbouring ones of the multiple discrete fundamental frequencies.

The method may comprise selecting the frequency offset to be larger than a frequency error between the transmitting device that will transmit the synchronisation sequence and another transmitting device in the communication network.

The method may comprise transmitting the synchronisation sequence as part of a frame.

The method may comprise transmitting a series of two or more frames and including the synchronisation sequence in each of those frames.

The method may comprise forming the synchronisation sequence such that the peaks are arranged in a pattern known to the receiving device.

According to a second embodiment of the invention, there is provided a communication device for operating in a wireless communication network, the communication device being configured to assist another communication device to synchronise with its transmissions by forming a synchronisation sequence that has a frequency spectrum comprising peaks at multiple discrete fundamental frequencies, a signal power of the synchronisation sequence being concentrated at those frequencies and transmitting said synchronisation sequence to the other communication device.

According to a third embodiment of the invention, there is provided a method for synchronising a receiving device with a transmitting device using a synchronisation sequence that has a frequency spectrum comprising multiple peaks arranged in a pattern known to the receiving device, the method comprising receiving the synchronisation sequence, determining a plurality of sets of candidate frequencies at which the multiple peaks might be arranged in the frequency spectrum of the received synchronisation sequence, each set of candidate frequencies being arranged in the known pattern, determining, for each candidate frequency set, an indication of a signal power contained in the received synchronisation sequence at the frequencies comprised in that candidate frequency set and synchronising the receiving device with the transmitting device in dependence on those indications.

The method may comprise determining, from the indications, frequency information for use in synchronising the receiving device with the transmitting device and using said frequency information to receive future transmissions by the transmitting device.

The method may comprise determining a frequency error of the receiving device relative to the transmitting device in dependence on the indications.

The method may comprise determining a frequency offset applied to the synchronisation sequence prior to transmission in dependence on the indications.

The method may comprise determining that a transmitting device has been detected if the indication determined for one of the candidate frequency sets is above a predetermined detection threshold.

The receiving device and the transmitting device may be configured to operate in a wireless communication network comprising at least one other transmitting device, each transmitting device being configured to transmit a synchronisation sequence having a frequency spectrum comprising multiple peaks arranged in the known pattern but located at different frequencies, and the method may comprise receiving a synchronisation sequence from each transmitting device, for each synchronisation sequence, determining the plurality of indications of signal power and identifying, in dependence on those indications, from which transmitting device at least one of the synchronisation sequences was received.

The method may comprise determining, if the indications determined for more than one of the candidate frequency sets is above a predetermined threshold, that more than one transmitting device has been detected.

The method may comprise selecting one of the more than one transmitting devices with which to communicate.

The method may comprise selecting the transmitting device in dependence on the indications of signal power determined for the candidate frequency sets associated with each of the more than one transmitting devices.

The method may comprise selecting the transmitting device in dependence on the frequency error of the receiving device relative to each of the more than one transmitting devices.

The method may comprise determining a noise level associated with the indications of signal power and adjusting the predetermined detection threshold in dependence on that noise level.

The method may comprise determining the noise level in dependence on the indications of signal power corresponding to the candidate frequency sets other than the candidate frequency set for which the indication of signal power was found to be above the threshold.

The method may comprise dividing the received synchronisation sequence into a plurality of segments, each segment comprising the same number of samples.

The method may comprise dividing the received synchronisation sequence into a plurality of non-overlapping segments.

The method may comprise dividing the received synchronisation sequence into a plurality of overlapping segments.

The method may comprise applying a window function to each of the plurality of segments.

The method may comprise oversampling the received synchronisation sequence prior to forming the plurality of segments from those samples.

The method may comprise performing a Fourier transform on each of the plurality of segments to obtain, in respect of each segment, a plurality of values representing the frequency content of that segment.

The method may comprise determining, for each candidate frequency set, the indication of signal power by calculating a representation of a signal energy associated with each of the plurality of values in each of the plurality of segments, for each candidate set of frequencies, summing the representations of signal energy in each segment that correspond to the frequencies in that candidate set and for each candidate set of frequencies, combining the sums of the representations of signal energy for successive ones of the plurality of segments.

The method may comprise determining, for each candidate frequency set, the indication of signal power by, for each frequency in each candidate set of frequencies, summing the values in successive ones of the plurality of segments that correspond to that frequency, calculating a representation of a signal energy associated with of each the summed values and for each candidate set of frequencies, combining the representations of signal energy corresponding to the frequencies in that set.

The transmitting device may be configured to apply a frequency offset to the synchronisation sequence prior to transmission, and the method may comprise processing the plurality of values using a function representative of an ideal transmitted energy at that frequency offset.

The method may comprise identifying, in dependence on the values representing the frequency content of each segment, a frequency that is subject to interference.

The method may comprise limiting the magnitude of each of the values representing the frequency content to a predetermined threshold.

The method may comprise, when a frequency is determined to be subject to interference, limiting the magnitude of any of the values representing frequency content that are associated with that frequency to a predetermined threshold.

According to a fourth embodiment of the invention, there is provided a communication device for operating in a wireless communication network, the communication device being configured to synchronise with another communication device by receiving a synchronisation sequence transmitted by the other communication device, the synchronisation sequence having a frequency spectrum comprising multiple peaks arranged in a pattern known to the communication device, determining a plurality of sets of candidate frequencies at which the multiple peaks might be arranged in the frequency spectrum of the received synchronisation sequence, each set of candidate frequencies being arranged in the known pattern, determining, for each candidate frequency set, an indication of a signal power contained in the received synchronisation sequence at the frequencies comprised in that candidate frequency set and synchronising with the other communication device in dependence on those indications.

For a better understanding of the present invention, reference is made by way of example to the following figures, in which.

The following description is presented to enable any person skilled in the art to make and use the system, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

One or more embodiments of the invention relate to a synchronisation signal that a base station or other communication device may transmit in order to facilitate detection and frequency error acquisition. Other embodiments relate to the receiver processing that a terminal or other communication device may perform to efficiently detect the signal and extract the frequency error estimate. The signal itself comprises multiple tones, rather than a single tone.

Suitably the synchronisation mechanism involves transmitting a synchronisation sequence comprising peaks at multiple discrete fundamental frequencies. The sequence is therefore distinguished from existing sequences consisting of a single tone, in which the frequency spectrum will only comprise a peak at one fundamental frequency. A signal power of the synchronisation sequence is suitably concentrated at those multiple frequencies.

Preferably substantially all of the signal power of the synchronisation sequence is contained in the multiple discrete frequencies. Ideally 100% of the signal power is divided between the discrete frequencies, with no signal power leaking outside of those precise frequencies. However, the concentration need not be 100%. Preferably at least 75% of the signal power, more preferably at least 90% of the signal power, and most preferably at least 95% of the signal power is concentrated in the discrete frequencies.

Using a signal in which the energy is concentrated in multiple discrete frequencies allows robust detection of a base station by a terminal, at very low signal to noise ratios and in the presence of multipath and interference, including determination of the frequency error of the base station relative to the terminal's internal frequency reference. The receiver processing at the terminal can also be implemented in a computationally efficient manner by exploiting the particular structure of the transmitted signal.

Preferably the arrangement of the discrete frequencies is known in advance to the receiving device. However, the precise frequencies themselves may not be known, e.g. because of a frequency error between the transmitting device and the receiving device. The transmitting device may also apply a frequency offset to the synchronisation sequence prior to transmission.

The receiving device may search the received signal for the particular pattern of frequency peaks that is the signature of the synchronisation sequence. The receiving device may determine a plurality of sets of candidate frequencies at which the multiple peaks might be arranged; each set of candidate frequencies being arranged in accordance with the known pattern or signature. The receiving device may then determine an indication of the signal power comprised at each of the frequencies in each of the candidate sets and use this information to synchronise with the transmitting device.

Figure 2:
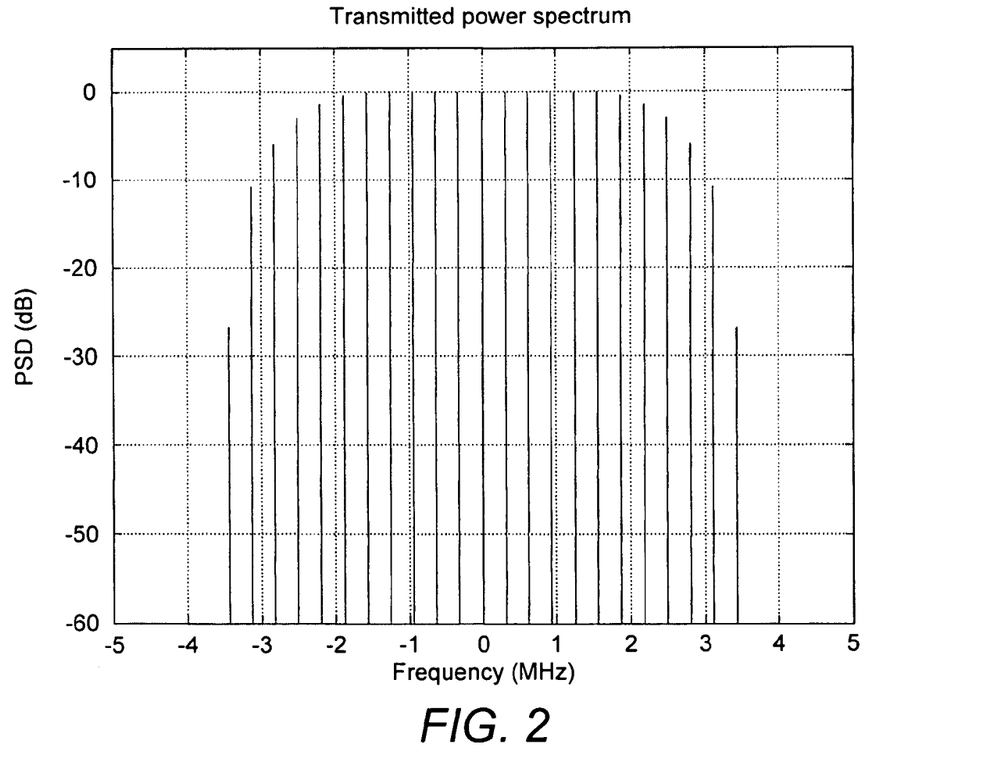
FIG. 2 shows an example of a synchronisation sequence in the frequency domain.

In a preferred embodiment of the invention, the synchronisation sequence takes the form of a comb-like spectrum so that the majority of the energy of the signal is concentrated at multiple, uniformly spaced frequencies. Many (if not all) of the peaks in the frequency spectrum of the signal will have substantially the same amplitude. An example of the frequency spectrum of such a signal is shown in FIG. 2. Other synchronisation sequences are possible, however. In particular, it should be understood that the receiving mechanisms described herein are applicable to signals whose frequency spectra display any known pattern, so that the receiver can search for the pattern in the received signal. The signals need not have a comb-like structure.

One or more embodiments of the invention will be described with specific reference to a wireless network in which the transmitting device is a base station and the receiving device is a terminal. This is for the purposes of example only. It should be understood that the mechanisms described herein may be implemented in any suitable communication network and by any suitable communication device, irrespective of its role in the network.

Figure 1:
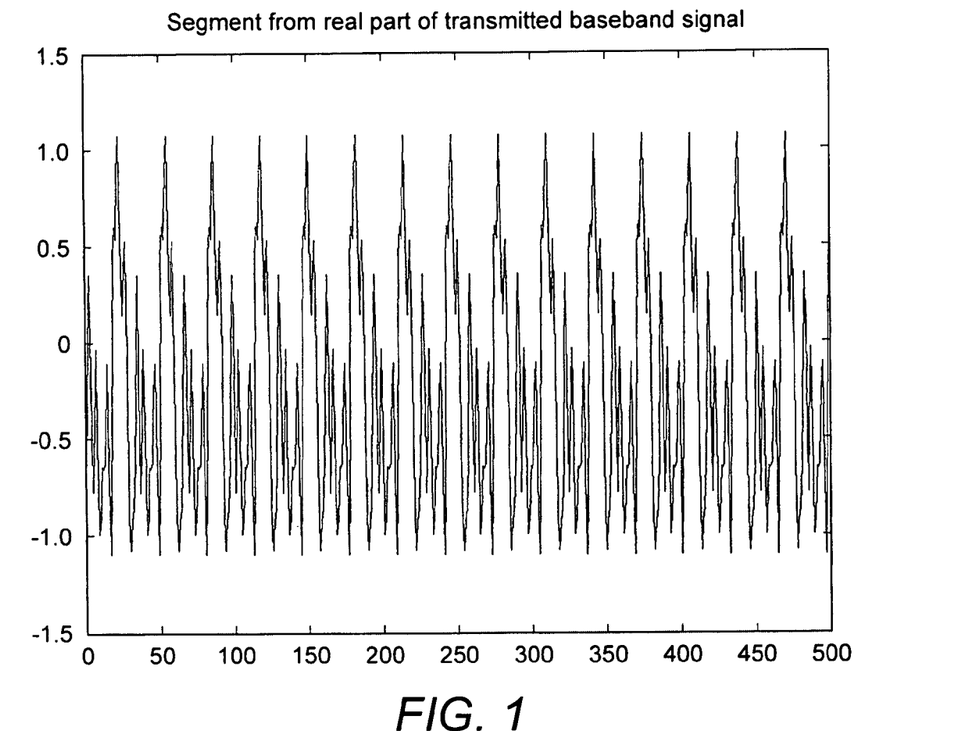
FIG. 1 shows an example of the real part of a complex baseband synchronisation signal in the time domain.
Figure 3:
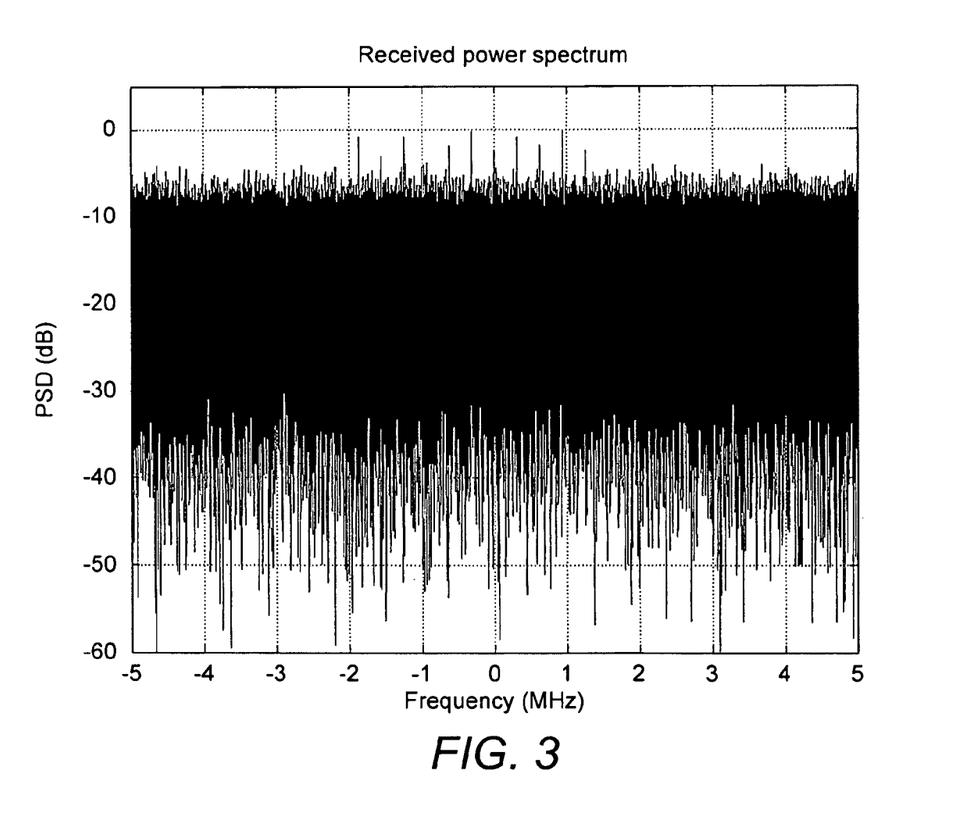
FIG. 3 shows an example of a synchronisation sequence in the frequency domain in the presence of noise.
Figure 4:
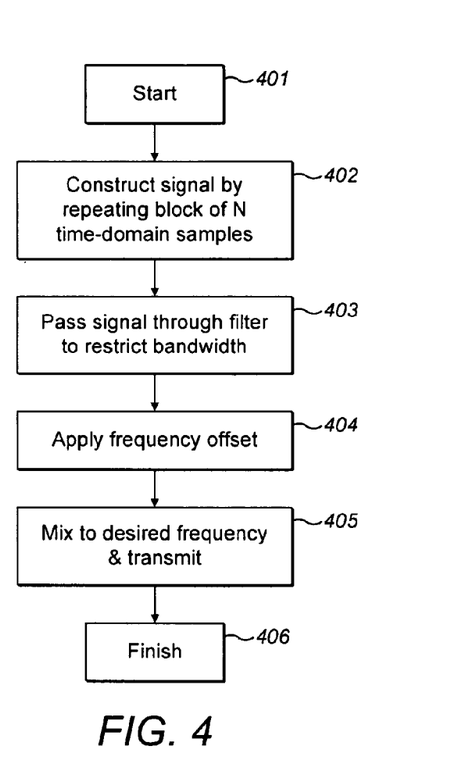
FIG. 4 shows an example of a process for forming and transmitting a synchronisation sequence.

An example of a process of forming and transmitting a synchronisation sequence is shown in FIG. 4, and can further be understood with reference to the various spectra of a synchronisation sequence shown in FIGS. 1 to 3.

The process starts in step 401. In step 402, the synchronisation signal is constructed in the time domain. A signal having a comb structure can be convenient constructed in the time domain by using a periodic repetition of an underlying block of N complex baseband samples. The block of N samples is suitably typically chosen to have the following properties:
1. Low peak to average power ratio (PAPR) to allow efficient amplification; and
2. Good autocorrelation properties (which equates to the discrete frequencies having similar energy).

There are many sequences that satisfy these requirements. Some examples include:
1. A pi/2 rotated BPSK signal derived from a suitable chosen bit sequence, where the bit sequence is selected to ensure low frequency domain ripple;
2. A pi/4 rotated QPSK signal derived from a suitably chosen bit sequence, where the bit sequence is selected to ensure low frequency domain ripple; and
3. A numerically derived sequence of complex samples that have been optimised for low peak to average in the time domain and also low ripple in the frequency domain.

In examples 1 and 2, the bit sequences might be based on known codes such as Gold codes, or might be derived computationally by an exhaustive or partial search of potential bit sequences.

The discrete frequencies have spacing Fs/N Hz, where Fs is the sampling frequency and N is the block length in samples. Examples of typical values are Fs=5 MHz and N=32, giving a separation between the discrete frequencies of 156.25 kHz.

The total length of the frame synchronisation signal may be N.R samples, where R is the number of repetitions of the N sample block. This length is chosen to provide sufficient overall processing gain to detect the signal in the worst case signal to noise ratio. For example, R could be many thousands for a system that needs to decode signals that are tens of dBs below the noise floor.

FIG. 1 illustrates a suitable synchronisation signal in the time domain. This figure shows the real part of a section of the transmitted signal, represented as a baseband signal. The periodic repetition of the underlying block can be seen.

FIG. 2 shows the corresponding comb spectrum in the frequency domain. This figure shows the transmitted power spectrum corresponding to the frame synchronisation signal. This is for a sampling frequency of Fs=10 MHz and a block length of N=32 samples.

In order to limit the bandwidth of the baseband signal, it may be passed through a pulse shaping filter prior to transmission (step 403). The filter may, for example, be a root-raised cosine filter (as with conventional PSK and QAM modulation schemes). The signal shown in FIG. 2 has been passed through a root-raised cosine pulse shaping filter with a 3 dB bandwidth of 5 MHz. The filter may remove any harmonics of the multiple frequencies of the synchronisation sequence, so that only the fundamental frequencies remain.

Each base station suitably transmits the same synchronisation sequence, so that the terminals know what pattern or signature they are looking for. Therefore, in order to avoid interference between multiple base stations that are operating on the same frequency channel, the frequency of the baseband signal may be offset via a mixing process (step 404). The frequency offset can be chosen to be different for each base station that is operating in a given locality, such that the discrete frequencies being transmitted by each base station do not coincide with the frequencies being transmitted by the other base stations. The frequency offsets are typically chosen such that they are smaller than the spacing between the discrete frequencies from any given base station (Fs/N), and larger than maximum frequency errors between base stations. The base station offset could be zero. The set of valid base station frequency offsets should be known to the terminal. This is so that the terminal can unambiguously determine the frequency error in its own frequency by comparing the estimated overall frequency offset with the nearest valid base station offset. The mixing process can be performed digitally or as part of the RF mixing.

The baseband signal is then mixed to the desired RF frequency and transmitted (step 405). (Note: the offset of step 404 may be applied as part of this mixing process.) The process terminates in step 406.

Figure 5:
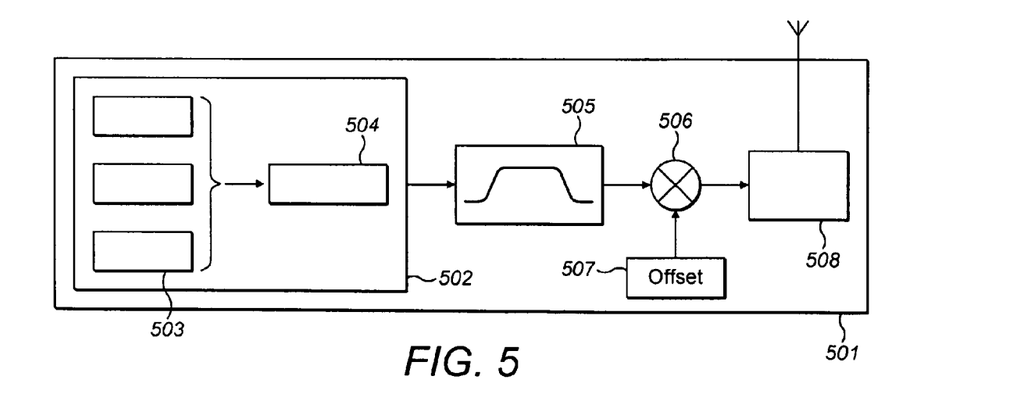
FIG. 5 shows an example of a communication device.

FIG. 5 shows an example of a communication device configured to generate a synchronisation sequence for assisting another device to synchronise with its transmissions. The communication device is shown generally at 501 and it comprises a synchronisation unit 502 for forming a time domain sequence 504 formed of periodically repeated blocks 503. The communication device also includes a filter 505, a mixer 506 for applying frequency offset 507 and communication unit 508 for transmitting the resulting signal over the air interface.

The benefit of the synchronisation signal described above and illustrated in FIGS. 1 to 3 compared to the single tone system is that it utilises many frequencies and therefore it is robust to multipath (because it is unlikely that all discrete frequencies will be in deep nulls) and it is robust to interferers (because it is unlikely that all discrete frequencies will be subject to narrowband interference). As with the single tone system, but unlike other schemes, it also allows for a computationally efficient detection method.

FIG. 3 shows the frequency spectrum of the same signal as FIG. 2 after the addition of noise and a frequency offset of 5 kHz. FIG. 3 shows the power spectrum of the received signal in which noise has been added to give an SNR of −25 dB. Because a very high resolution FFT was used to generate this figure, the comb spectrum is just visible despite the very poor SNR. The receiving device needs to implement a detection mechanism that can deal with such poor SNRs.

Figure 6:
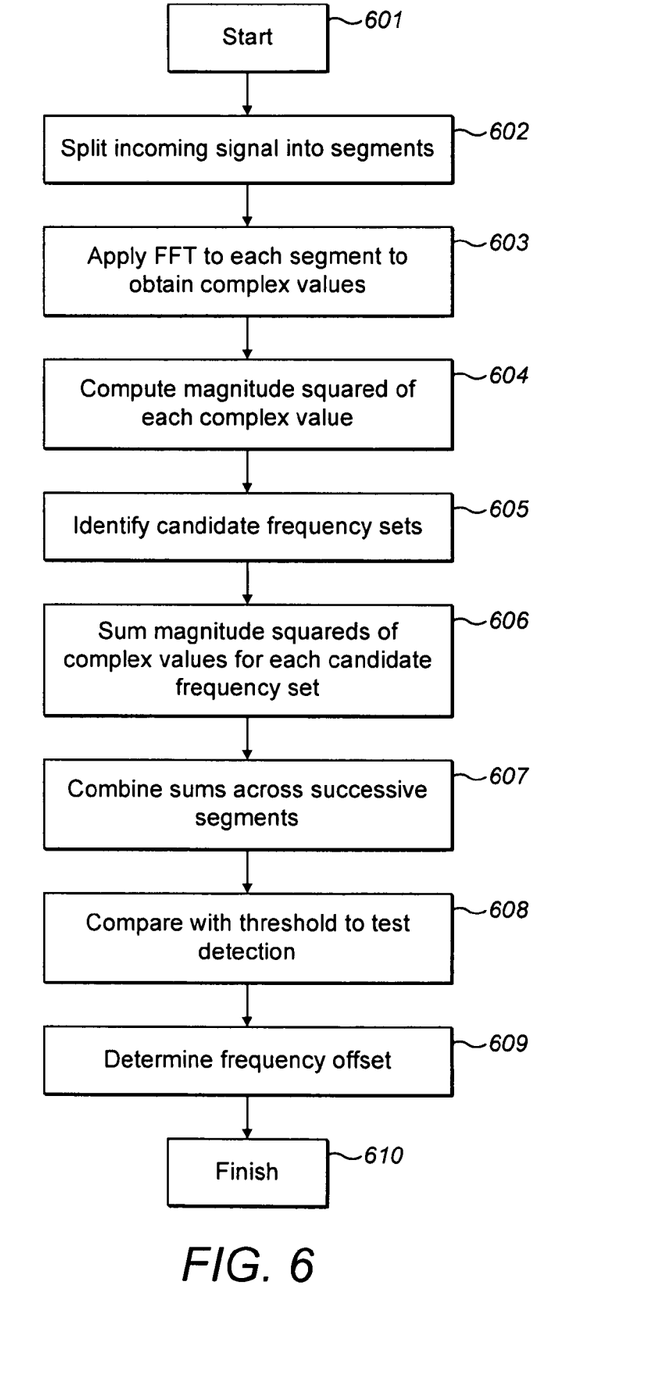
FIG. 6 shows an example of a process for receiving and processing a synchronisation sequence.

The detection method, which may be implemented in the receiver of a terminal, is based on a frequency analysis of the received signal. In this example, the terminal is looking for a comb spectrum having the desired frequency spacing. This frequency analysis can be efficient implemented using a fast Fourier transform (FFT) or similar methods. An example of such a process is shown in FIG. 6.

The process starts in step 601. In step 602, the incoming signal is split into segments of length N.S samples where S is an integer and where it is generally convenient for N.S to be a power of 2. An FFT of order N.S is then applied to each segment to yield N.S complex values representing the frequency content of that data segment (step 603). Each complex value may then be processed by any function suitable for producing an output related to the energy of the signal at that frequency (e.g. a magnitude function). In the specific example of FIG. 6, the magnitude-squared of each complex FFT output is calculated (step 604). This has the effect of making the subsequent processing invariant to the channel multipath since the multipath is an unknown complex multiplier on each frequency component of the signal.

The terminal then determines one or more candidate sets of frequencies at which it might expect to find peaks in the frequency spectrum of the received synchronisation sequence (step 605). Each candidate set preferably follows the same pattern, i.e. the frequencies in each candidate set are spaced at the uniform spacing that the terminal knows to expect from the comb. The candidate sets preferably cover each possible frequency offset of the comb. This depends on the possible base station frequency offsets and on the maximum frequency error between any base station and the terminal's internal frequency reference.

In step 606, the terminal identifies the magnitude-squared complex FFT outputs corresponding to each of the frequencies in a candidate set. For each candidate set, the identified magnitude-squared complex FFT outputs are summed. This computes the total received power corresponding to a possible comb, and is repeated for each potential frequency offset.

In step 607, the total received power for each segment is summed over successive segments in order to provide further integration of energy. This provides improved processing which may allow detection in low SNR conditions. The combining process may involve filtering such as a running average or an IIR filter so that old outputs prior to the start of the relevant base station transmission are discarded. This allows the detector to be run continuously without giving false detections when the base station is not transmitting the frame synchronisation signal.

In step 608, the computed received power for each possible comb frequency offset is compared against a threshold to determine when detection has occurred. Following detection, the frequency error of the terminal relative to the base station can be determined from the frequency offset at which the maximum power occurred (step 609). The process terminates in step 610.

Figure 7:
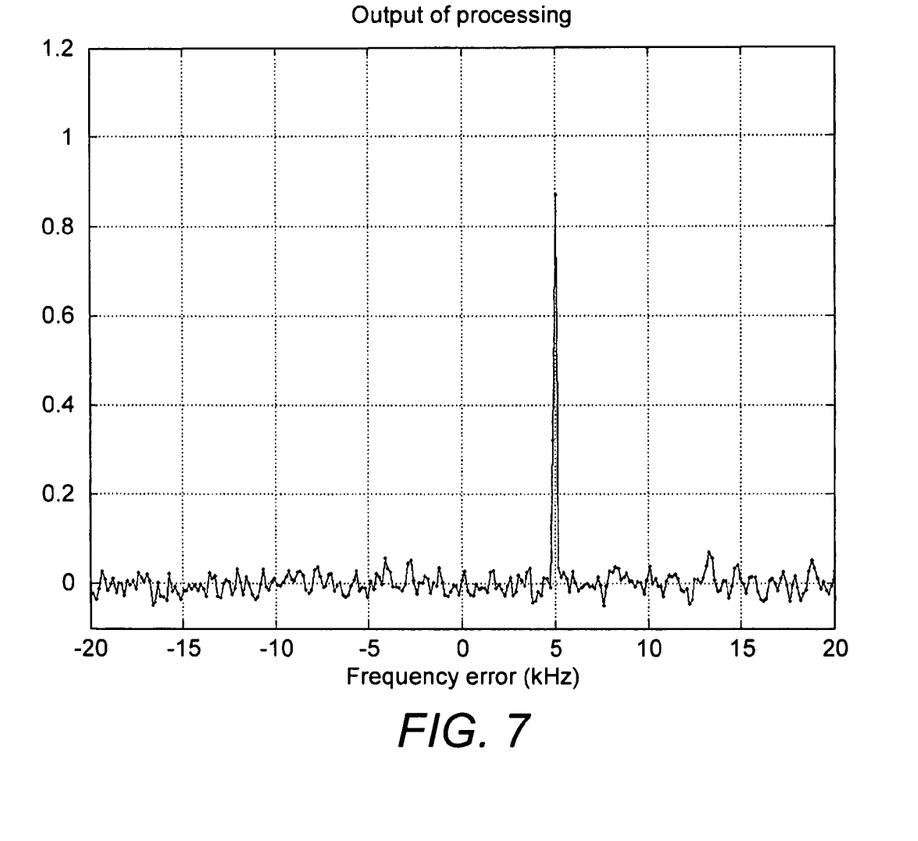
FIG. 7 shows an example of an output from processing a synchronisation sequence.

FIG. 7 shows the typical output of the detector, in which detector output is plotted against frequency error for a given base station frequency offset. This figure shows the final output from the processing, following the combining of the power in each discrete frequency followed by the combining of multiple FFT outputs. The number of repetitions, R, of the underlying block was 8192, and the FFT size, N.S, was 16384. There is a clear peak at a 5 kHz frequency offset, which demonstrates that it is possible to detect the presence of the signal and the frequency offset at SNRs that are well below the simulated value of −25 dB.

There are some changes that might be made to the process illustrated in FIG. 6. First, the segments of the signal to which the FFT is applied may be overlapped. This may give some performance improvement at the expense of additional computation. Second, the outputs of a number of successive FFTs may be combined coherently (i.e. adding as complex numbers the FFT outputs for the same frequency bin) prior to taking the magnitude-squared and adding the components for each possible comb. This provides a trade-off between increased processing gain, as a result of more coherent rather than incoherent combining, versus reduced tolerance to changes in the channel characteristics (e.g. Doppler).

There are also several possible refinements that might be made either to the process illustrated in FIG. 6 or any of the altered processes described above:

- The FFTs may be applied to an oversampled received signal. For example, the received signal might be sampled using a sampling frequency that is twice the bandwidth of the transmitted signal.
- The segments of the signal to which the FFT is applied may be windowed in order to reduce the sidelobe amplitudes of the frequency domain analysis.
- The FFT outputs may be weighted by a function that reflects the ideal transmitted energy at each frequency offset. A suitable function might be a root-raised cosine function.
- The detection threshold may be scaled as a function of the total energy across all the possible frequency offsets. This can ensure that detection only occurs if the peak adequately exceeds the noise floor in the detector output (i.e. the signal energy at frequency offsets away from the peak of FIG. 7), which can be helpful in reducing the false alarm rate.
- Output values in the vicinity of the peak may be interpolated to obtain increased resolution in the frequency error estimate.
- The magnitude of the FFT outputs may be limited prior to combining with other FFT outputs. This acts to limit the impact of narrowband interference. If a single frequency within the comb spectrum coincides with an interferer, then the contribution of this interferer is attenuated by the limiting process. In an extreme case, particular output values from the FFT could be set to zero to remove entirely frequency ranges that are thought to contain large interferers.

The mechanisms described above can simultaneously detect all base stations that are within range of the terminal, assuming these base stations have been assigned different frequency offsets by the network core. For example, if there are two base stations in range, then two peaks will be present in the detector output. The terminal can then choose which base station to subsequently receiver. This decision may be based, for example, on the magnitude of the peak associated with that particular base station, given that this is an indication of signal to noise ratio. The preferred base station for subsequent reception may also be selected based on an SNR estimate obtained using the magnitude of the peak and the average noise at other frequency offsets.

The base stations may be synchronised in time (e.g. by means of GPS) so it is quite possible that the processing will yield multiple peaks corresponding to multiple base stations that are in range and on the same RF channel. The receiver processes described above may return a number of candidate base stations, with their associated frequency errors and "power" levels, so that the terminal can decide with which of the base stations to communicate. This processing may be performed at a higher level, e.g. the MAC layer.

Figure 8:
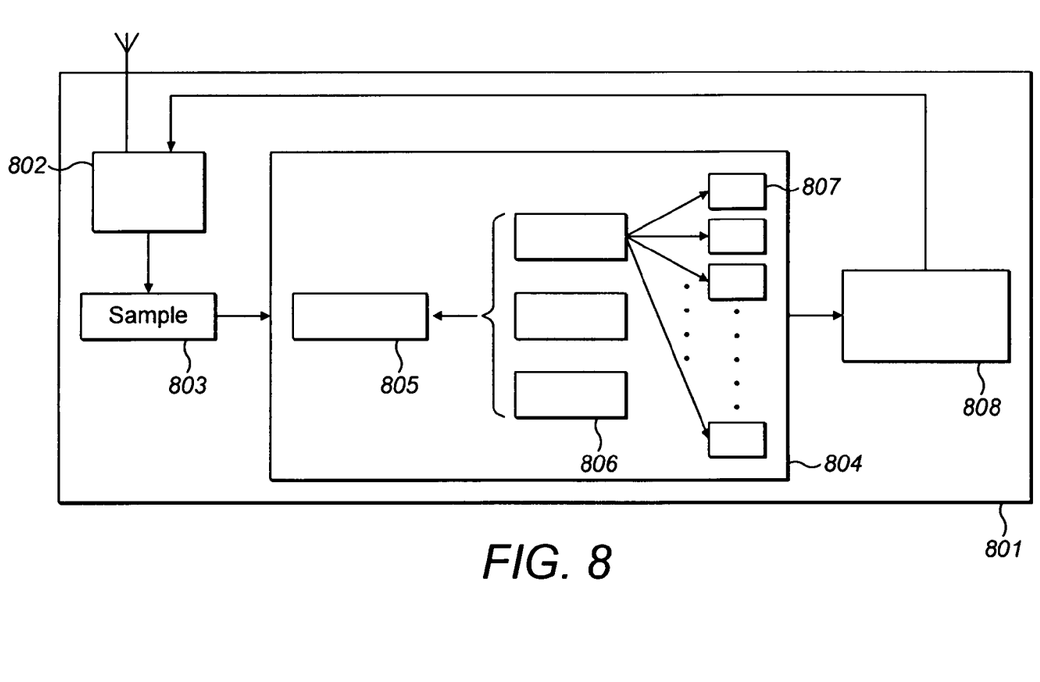
FIG. 8 shows an example of a communication device.

FIG. 8 shows an example of a communication device configured to detect a synchronisation sequence for synchronising with the transmissions of another device. The communication device is shown generally at 801. It comprises a communication unit 802 for receiving signals and a sampling unit 803 for sampling the received signal. The sampled signal may be passed to a transform unit 804 for dividing the incoming samples 805 into segments 806 and applying a discrete Fourier transform to those segments to obtain a series of complex values associated with a plurality of frequency bins 807. The complex values may then be passed to a processing unit 808 for further analysis (as described above). The results of that analysis may be fed back to the communication unit to aid future reception. This feedback may include at least two outputs: the base station frequency offset (which may act as an identifier of the base station) and the frequency error associated with that base station.

Figure 9:
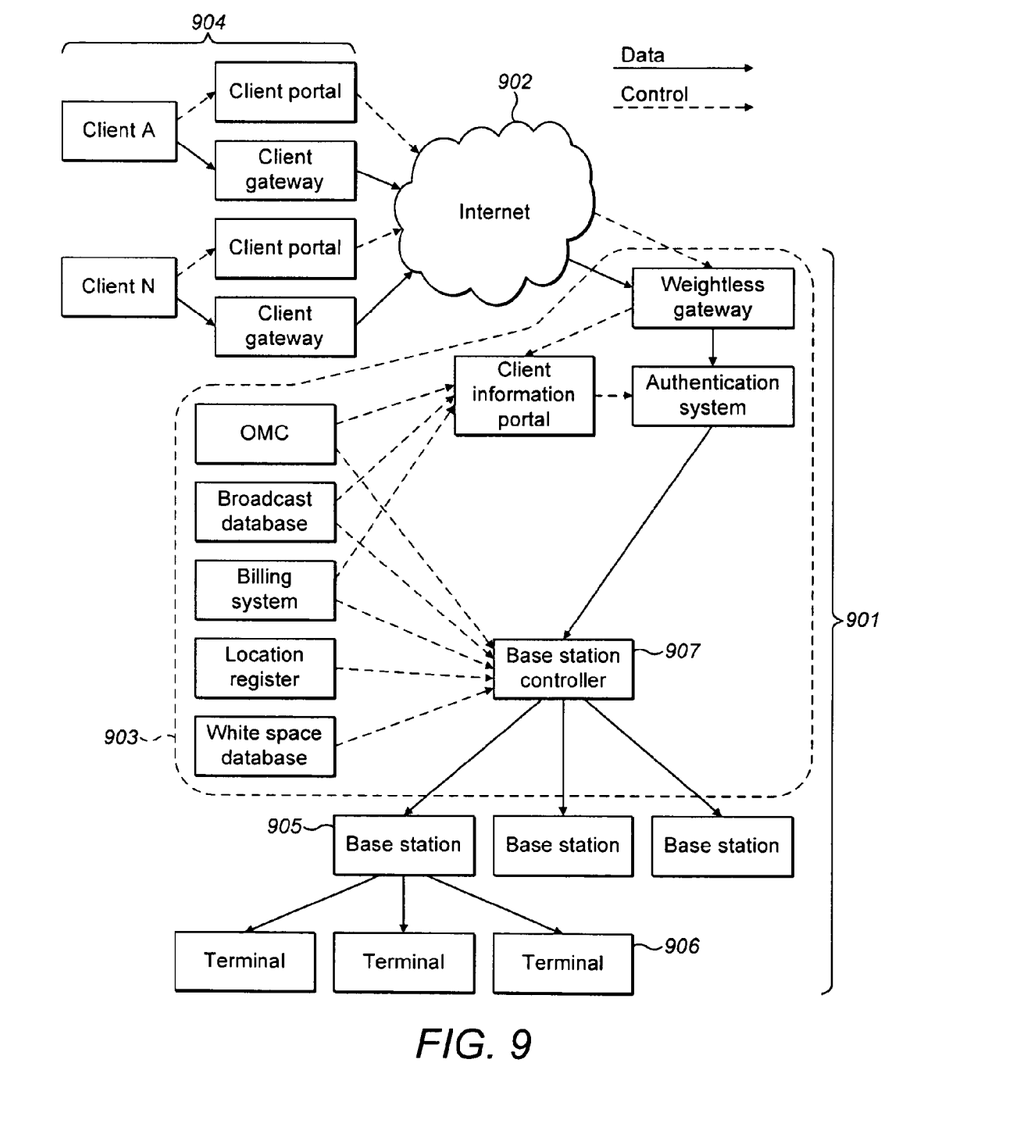
FIG. 9 shows an example of a communication network.

A suitable communication network in which one or more embodiments of the invention might be implemented is shown in FIG. 9. The network, which is shown generally at 901, comprises a network core 903 and one or more base stations 905 that are each capable of communicating wirelessly with a number of terminals 906. Each base station may be arranged to communicate with terminals that are located within a particular geographical area or cell. The base stations transmit to and receive radio signals from the terminals. The terminals are entities embedded in machines or similar that communicate with the base stations. Suitably the wireless network is arranged to operate in a master-slave mode where the base station is the master and the terminals are the slaves. Each base station may be arranged to communicate with a large number of terminals, e.g. a thousand or more.

The base station controller 907 is a device that provides a single point of communication to the base stations and then distributes the information received to other network elements as required. The network may be arranged to communicate with a client-facing portion 904 via the internet 902. In this way a client may provide services to the terminals via the wireless network.

Other logical network elements shown in this example are:
  Network core. This routes traffic information between base stations and client networks.
  Billing system. This records utilisation levels and generates appropriate billing data.

Authentication system. This holds terminal and base station authentication information.

Location register. This retains the last known location of the terminals.

Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 9 may be used for machine-to-machine communications, i.e. communications that do not involve human interaction. Machine-to-machine communications are well-matched to the limitations of operating in white space, in which the bandwidth available to the network may vary from one location to another and also from one time instant to the next. "White space" refers to the unused parts of the spectrum in and around terrestrial television broadcasts. Typically white space is found in the UHF TV band and spans 450 MHz to 800 MHz, depending on the country. A large amount of spectrum has been made available for unlicensed or opportunistic access in this frequency range.

As the network does not have any specific part of the spectrum allocated to it, even unallocated parts of the spectrum may become unavailable, e.g. due to a device in the vicinity that is operating outside of the network but using the same part of the spectrum. Machines are well-adapted to tolerating the delays and breaks in communication that can result from these varying communication conditions. The network should also be adapted to the communication conditions. For example, the network may make use of frequency hopping sequences (which are suitably different for neighbouring cells), different data rates (which can be adapted to the signal conditions and technical capabilities of particular terminals), spreading codes (which can also be adapted to the signal conditions and technical capabilities of the terminals) and acknowledgement mechanisms (so that lost packets can be identified and resent).

Figure 10:
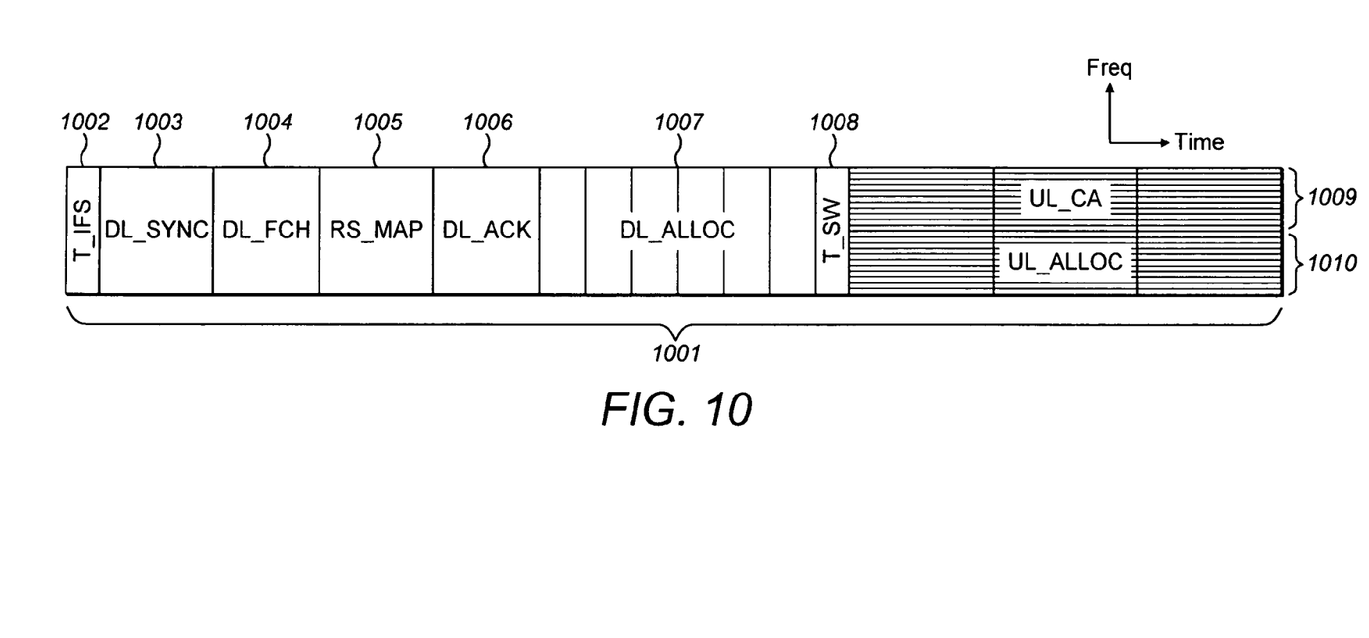
FIG. 10 shows an example of a communication frame.

The base station may use a frame structure to organise communications with the plurality of terminals in its cell. Medium access control (MAC) may be used to share the available radio resource between the plurality of terminals. An example of a suitable frame is shown in FIG. 10. The frame (shown generally at 1001) comprises time to ramp-up to full output power 1002 (T_IFS), a synchronisation burst 1003 (DL_SYNC), an information field providing the subsequent channel structure 1004 (DL_FCH), a map of which information is intended for which terminal and uplink timeslot allocations 1005 (RS_MAP), a field to allow acknowledgement of previous uplink transmissions 1006 (DL_ACK) and then the actual information to be sent to terminals 1007 (DL_ALLOC). There is then a guard period for ramp-down of the downlink and ramp-up on the uplink 1008 (T_SW), followed by channels set aside for uplink contended access 1009 (UL_CA) in parallel with the allocated uplink data transmissions 1010 (UL_ALLOC). The synchronisation sequence is suitably transmitted as synchronisation burst DL_SYNC.

Each frame is suitably two seconds long. The base stations may be arranged to periodically transmit a broadcast frame that all terminals should listen to as far as possible. The base station may use this frame to transmit multicast control messages such as: forthcoming changes to the channel assignment/hopping sequences; uplink transmit power limits; supplementary data transfers; and changes to the broadcast frame interval. This frame may be transmitted around once every 15 minutes, and may be considered to form the first frame of a "super-frame". The frame may be known as the "broadcast channel". The frequency of this frame is a trade-off. If it is too frequent the terminals will consume excessive battery power listening to the broadcast frames. If it is too infrequent, it may take too long to "page" or "poll" terminals and the frequency with which network parameters can be changed decreases.

The base station controller may format data that is to be transmitted over the network into a series of frames. It may pass each frame to the base station for communication over the network, so that in effect the base stations are just provided with pre-formatted frames for transmission. The base stations may therefore be relatively simple devices that take pre-formatted frames of information and transmit them. Therefore, in some arrangements it may be the base station controller that forms the synchronisation sequence, which is then passed to the base station for transmission.

The apparatus in FIGS. 5 and 8 are shown illustratively as comprising a number of interconnected functional blocks. This is for illustrative purposes and is not intended to define a strict division between different parts of hardware on a chip. In practice, the communication devices preferably use a microprocessor acting under software control for implementing the methods described herein. In some embodiments, the algorithms may be performed wholly or partly in hardware.

An example of the protocol according to which the communication network and the communication devices described herein are configured to operate is a machine-to-machine protocol such as Weightless. This is an example only, and it should understand that any suitable communication protocols might be used.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A method for synchronising a receiving device with a transmitting device using a synchronisation sequence that has a frequency spectrum comprising multiple peaks arranged in a pattern known to the receiving device, the method comprising:

receiving the synchronisation sequence;
dividing the received synchronisation sequence into a plurality of segments;

performing a Fourier transform on each of the plurality of segments to obtain, in respect of each segment, a plurality of values representing the frequency content of that segment;

determining a plurality of sets of candidate frequencies at which the multiple peaks might be arranged in the frequency spectrum of the received synchronisation sequence, each set of candidate frequencies being arranged in the known pattern; determining, for each candidate frequency set, an indication of a signal power contained in the received synchronisation sequence at the frequencies comprised in that candidate frequency set in dependence on the plurality of values representing the frequency content of the plurality of segments; and synchronising the receiving device with the transmitting device in dependence on those indications.

2. A method as claimed in claim 1, comprising determining, from the indications, frequency information for use in synchronising the receiving device with the transmitting device and using said frequency information to receive future transmissions by the transmitting device.

3. A method as claimed in claim 1, comprising determining a frequency error of the receiving device relative to the transmitting device in dependence on the indications.

4. A method as claimed in claim 1, comprising determining a frequency offset applied to the synchronisation sequence prior to transmission in dependence on the indications.

5. A method as claimed in claim 1, comprising determining that a transmitting device has been detected if the indication determined for one of the candidate frequency sets is above a predetermined detection threshold.

6. A method as claimed in claim 5, comprising determining a noise level associated with the indications of signal power and adjusting the predetermined detection threshold in dependence on that noise level, further comprising determining the noise level in dependence on the indications of signal power corresponding to the candidate frequency sets other than the candidate frequency set for which the indication of signal power was found to be above the threshold.

7. A method as claimed in claim 5, comprising determining, if the indications determined for more than one of the candidate frequency sets is above a predetermined threshold, that more than one transmitting device has been detected, and comprising selecting one of the more than one transmitting devices with which to communicate, and comprising selecting the transmitting device in dependence on the indications of signal power determined for the candidate frequency sets associated with each of the more than one transmitting devices.

8. A method as claimed in claim 7, comprising determining a frequency error of the receiving device relative to the transmitting device in dependence on the indications, and further comprising selecting the transmitting device in dependence on the frequency error of the receiving device relative to each of the more than one transmitting devices.

9. A method as claimed in claim 1, the receiving device and the transmitting device being configured to operate in a wireless communication network comprising at least one other transmitting device, each transmitting device being configured to transmit a synchronisation sequence having a frequency spectrum comprising multiple peaks arranged in the known pattern but located at different frequencies, the method comprising:

receiving a synchronisation sequence from each transmitting device;

for each synchronisation sequence, determining the plurality of indications of signal power; and identifying, in dependence on those indications, from which transmitting device at least one of the synchronisation sequences was received.

10. A method as claimed in claim 1, comprising dividing the received synchronisation sequence into a plurality of segments that each comprise the same number of samples.

11. A method as claimed in claim 1, comprising dividing the received synchronisation sequence into a plurality of non-overlapping segments.

12. A method as claimed in any of claim 1, comprising dividing the received synchronisation sequence into a plurality of overlapping segments.

13. A method as claimed in claim 1, comprising applying a window function to each of the plurality of segments.

14. A method as claimed in claim 1, comprising oversampling the received synchronisation sequence prior to forming the plurality of segments from those samples.

15. A method as claimed in claim 1, comprising determining, for each candidate frequency set, the indication of signal power by:

calculating a representation of a signal energy associated with each of the plurality of values in each of the plurality of segments;

for each candidate set of frequencies, summing the representations of signal energy in each segment that correspond to the frequencies in that candidate set; and for each candidate set of frequencies, combining the sums of the representations of signal energy for successive ones of the plurality of segments.

16. A method as claimed in any of claim 1, comprising determining, for each candidate frequency set, the indication of signal power by:

for each frequency in each candidate set of frequencies, summing the values in successive ones of the plurality of segments that correspond to that frequency;

calculating a representation of a signal energy associated with of each the summed values; and for each candidate set of frequencies, combining the representations of signal energy corresponding to the frequencies in that set.

17. A method as claimed in claim 1, wherein the transmitting device is configured to apply a frequency offset to the synchronisation sequence prior to transmission, the method comprising processing the plurality of values using a function representative of an ideal transmitted energy at that frequency offset.

18. A method as claimed in claim 1, comprising identifying, in dependence on the values representing the frequency content of each segment, a frequency that is subject to interference, wherein when a frequency is determined to be subject to interference, limiting the magnitude of any of the values representing frequency content that are associated with that frequency to a predetermined threshold.

19. A method as claimed in claim 1, comprising limiting the magnitude of each of the values representing the frequency content to a predetermined threshold, wherein when a frequency is determined to be subject to interference, limiting the magnitude of any of the values representing frequency content that are associated with that frequency to a predetermined threshold.

20. A communication device for operating in a wireless communication network, the communication device comprising: a communication unit configured to receive a synchronisation sequence transmitted by a transmitting communication device, the synchronisation sequence having a frequency spectrum comprising multiple peaks arranged in a pattern known to the communication device; a transforming unit configured to divide the received synchronisation sequence into a plurality of segments and to perform a Fourier transform on each of the plurality of segments to obtain, in respect of each segment, a plurality of values representing the frequency content of that segment; and a processing unit configured to determine a plurality of sets of candidate frequencies at which the multiple peaks might be arranged in the frequency spectrum of the received synchronisation sequence, each set of candidate frequencies being arranged in the known pattern, to determine, for each candidate frequency set, an indication of a signal power contained in the received synchronisation sequence at the frequencies comprised in that candidate frequency set in dependence on the plurality of values representing the frequency content of the plurality of segments; and to synchronise with the transmitting communication device in dependence on those indications.

* * * * *